US011118243B2

(12) United States Patent
McGrath et al.

(10) Patent No.: US 11,118,243 B2
(45) Date of Patent: Sep. 14, 2021

(54) MEASUREMENT APPARATUS FOR MEASURING A VOLUME OF A DESIRED SOLID COMPONENT IN A SAMPLE VOLUME OF A SOLID-LIQUID SLURRY

(71) Applicant: CURTIN UNIVERSITY OF TECHNOLOGY, Bentley (AU)

(72) Inventors: Teresa Diane Hayward McGrath, Rossmoyne (AU); Mark Robert Hubble, Mooroopna (AU); William John McCallum, Tatura (AU); William Patrick Staunton, North Perth (AU)

(73) Assignee: Curtin University

( * ) Notice: Subject to any disclaimer, the term of this patent is extended or adjusted under 35 U.S.C. 154(b) by 807 days.

(21) Appl. No.: 15/743,632

(22) PCT Filed: Jul. 13, 2015

(86) PCT No.: PCT/AU2015/000410
§ 371 (c)(1),
(2) Date: Apr. 26, 2018

(87) PCT Pub. No.: WO2017/008097
PCT Pub. Date: Jan. 19, 2017

(65) Prior Publication Data
US 2018/0223389 A1 Aug. 9, 2018

(51) Int. Cl.
*C22B 3/24* (2006.01)
*C22B 11/00* (2006.01)
(Continued)

(52) U.S. Cl.
CPC ............... *C22B 3/24* (2013.01); *C22B 11/04* (2013.01); *G01F 22/00* (2013.01); *G01N 1/02* (2013.01);
(Continued)

(58) Field of Classification Search
CPC . C22B 11/04; C22B 11/08; C22B 3/24; G01F 22/00; G01F 23/0076; G01F 23/02;
(Continued)

(56) References Cited

U.S. PATENT DOCUMENTS

| 2,743,154 | A | * | 4/1956 | Kaufman | ................. B01J 47/10 |
|---|---|---|---|---|---|
| | | | | | 423/7 |
| 4,240,617 | A | * | 12/1980 | MacKay | .............. G03C 5/3956 |
| | | | | | 266/170 |

(Continued)

FOREIGN PATENT DOCUMENTS

| CN | 203763917 | 8/2014 |
|---|---|---|
| CN | 204311562 | 5/2015 |

(Continued)

*Primary Examiner* — John Fitzgerald
*Assistant Examiner* — Truong D Phan
(74) *Attorney, Agent, or Firm* — Galbreath Law Offices, P.C.; John A. Galbreath

(57) ABSTRACT

The invention discloses a measurement apparatus for measuring a volume of a desired solid component in a sample volume of a solid-liquid slurry. The sample volume of the slurry is received into a receptacle and screened to separate out the desired solid component from a remainder of the slurry, whereby the solid component is retained in the receptacle to form a bed therein and the remainder is exhausted. The height of the bed is subsequently measured by a laser being adapted to emit a laser beam into the receptacle, thereby enabling a determination of a volume and/or mass of the solid component retained in the receptacle. The invention further discloses a control system for a leaching plant utilising the measurement apparatus.

23 Claims, 6 Drawing Sheets

(51) Int. Cl.
*G01N 1/10* (2006.01)
*G01N 1/40* (2006.01)
*G01F 22/00* (2006.01)
*G01N 1/02* (2006.01)
*C22B 11/08* (2006.01)

(52) U.S. Cl.
CPC ............. *G01N 1/10* (2013.01); *G01N 1/4077* (2013.01); *C22B 11/08* (2013.01); *G01N 2001/1025* (2013.01); *G01N 2001/4088* (2013.01); *Y02P 10/20* (2015.11)

(58) Field of Classification Search
CPC . G01F 23/20; G01N 1/02; G01N 1/10; G01N 1/4077; G01N 2001/1025; G01N 2001/4088; G01N 2001/1006; G01N 2035/1053; G01N 2015/0042; G01N 2291/02416; G01N 2291/02441; G01N 2291/0252; Y02P 10/20
See application file for complete search history.

(56) References Cited

U.S. PATENT DOCUMENTS

| | | | | |
|---|---|---|---|---|
| 4,502,952 A | * | 3/1985 | Naden | B03B 7/00 210/86 |
| RE32,763 E | * | 10/1988 | Fernholtz | A47L 15/4436 134/25.1 |
| 4,882,094 A | * | 11/1989 | Rubin | G21F 9/34 210/380.1 |
| 4,992,097 A | * | 2/1991 | Fricker | C22B 11/08 75/733 |
| 5,385,668 A | * | 1/1995 | Greenhalgh | C22B 3/02 210/257.1 |
| 5,460,779 A | * | 10/1995 | Kratzer | G01N 33/4905 422/512 |
| 5,628,912 A | * | 5/1997 | Nesseth | B01D 33/801 210/768 |
| 5,637,233 A | | 6/1997 | Earrusso | |
| 6,148,679 A | * | 11/2000 | Mann | G01N 1/20 73/863.51 |
| 6,178,383 B1 | | 1/2001 | Pegram | |
| 6,280,429 B1 | * | 8/2001 | Lewis | A61M 1/0056 210/323.1 |
| 2007/0106177 A1 | * | 5/2007 | Hama | A61M 1/0021 600/573 |
| 2008/0173591 A1 | * | 7/2008 | Hitchings | B01D 39/086 210/767 |
| 2008/0185349 A1 | * | 8/2008 | Willliams | B01L 3/50825 210/767 |
| 2011/0189701 A1 | * | 8/2011 | Kim | G01N 33/558 435/7.9 |
| 2012/0159969 A1 | * | 6/2012 | Hermeling | F17C 9/02 62/45.1 |
| 2012/0261356 A1 | * | 10/2012 | Tsutsui | G01N 33/491 210/767 |
| 2013/0230720 A1 | * | 9/2013 | Levanduski | C21B 13/08 428/403 |
| 2014/0116950 A1 | | 5/2014 | Heydecke | |
| 2014/0121560 A1 | * | 5/2014 | Parks | A61M 1/0056 600/562 |
| 2014/0256522 A1 | * | 9/2014 | Holt, IV | A63B 21/4035 482/110 |
| 2014/0370181 A1 | * | 12/2014 | Young | A23F 5/12 426/595 |
| 2016/0073827 A1 | * | 3/2016 | Katsumaru | A47J 43/22 210/767 |
| 2016/0089706 A1 | * | 3/2016 | Read | B09C 1/08 405/129.57 |
| 2016/0289418 A1 | * | 10/2016 | Donovan | B01J 20/28016 |
| 2016/0341431 A1 | * | 11/2016 | Topfer | B08B 9/0936 |
| 2016/0341649 A1 | * | 11/2016 | Kittelson | B01F 15/00272 |
| 2018/0354028 A1 | * | 12/2018 | Rundquist | C22B 9/02 |
| 2019/0381497 A1 | * | 12/2019 | Di Carlo | C12N 5/0012 |

FOREIGN PATENT DOCUMENTS

| | | |
|---|---|---|
| GB | 780406 | 7/1957 |
| GB | 1061896 | 3/1967 |
| GB | 2104481 | 3/1983 |

\* cited by examiner

MEASUREMENT APPARATUS FOR MEASURING A VOLUME OF A DESIRED SOLID COMPONENT IN A SAMPLE VOLUME OF A SOLID-LIQUID SLURRY

FIELD OF INVENTION

The present invention relates to a measurement apparatus for measuring a volume of a desired solid component in a sample volume of a solid-liquid slurry.

BACKGROUND ART

In a carbon-in-pulp or a carbon-in-leach extraction process, run of mine ore is first comminuted by crushing and/or grinding into fine particles and then leached in a cyanide solution to extract the gold from the ore. The leached pulp or slurry is mixed with activated carbon particles, which act as a collector, whereby the gold cyanide complex is deposited by adsorption onto the carbon particles. The gold-loaded carbon particles are then removed from the slurry for further processing to recover the gold from the carbon.

The activated carbon is mixed with the gold-cyanide slurry in a series of tanks in a counter-current flow arrangement. The amount of carbon present within the tanks or the concentration thereof in the slurry is a key parameter that needs to be carefully controlled to ensure optimal operation of the carbon adsorption step to minimize cost and to maximize gold recovery. If the carbon concentration is too low, then too little gold will be deposited onto the carbon particles and uncollected gold will be lost to tailings. Alternatively, if the carbon concentration is too high, then the carbon particles will be underutilized and the cost of the carbon will be higher than necessary.

Each of the adsorption tanks is normally mechanically agitated and contains a batch of carbon particles in a concentration range of typically 1-30 grams of carbon per litre of pulp, or alternatively in the range of 10-25 grams of carbon per litre of pulp. After a suitable period of time for the adsorption equilibrium to be reached, the carbon is moved along to the next tank in the series. The carbon particles are moved by pumping the carbon containing-pulp up circuit in a batch process, countercurrent to the normal flow direction of the pulp, to the next tank in series. Fully loaded carbon particles are removed from the first tank for further processing by acid washing, elution and regeneration, whereas regenerated carbon particles and some fresh carbon particles are introduced to the last tank. It is necessary to monitor the changes in the concentration of the carbon particles in the respective tanks to determine the rate of movement of the carbon between the tanks.

Various process modelling packages are available for use in determining the key carbon concentration set points required to maintain optimum management of the leaching circuit—identifying set points for the total amount of carbon particles in the system, its distribution between the tanks and the rate of transfer between tanks.

However, current methods for measuring the actual carbon concentration within each of the tanks are unreliable and inaccurate. The method most commonly employed uses manual sampling. This involves an operator taking a small sample through the top of each tank by lowering a bucket-on-a-stick' type scoop into the slurry in the tank. The carbon caught in the bucket is strained out and its volume measured, which is then converted to a mass by using a density factor. A number of problems are associated with such a manual sampling system, most notably being:

The time consuming nature and difficulty thereof in requiring a person to climb on top of the tank to take the sample, with the associated burden of distracting the person from performing other tasks.

Irregular sampling times

The small sample size taken from the tank by the scoop, typically only being about 1-2 litres.

Inaccuracies in the sample due to operator error and edge effects from taking a sample relatively close to the surface of the tank.

Furthermore there tend to be inaccuracies in the reported data as some operators round off the calculated concentration values to whole numbers. Anecdotal evidence further suggests that the above problems lead to operators avoiding their duties by taking samples less frequently than desired and, occasionally falsifying some measurements by simply estimating values without taking any samples.

SUMMARY OF THE INVENTION

According to one aspect of the present invention, there is provided a measurement apparatus for measuring a volume of a desired solid component in a sample volume of a solid-liquid slurry, the measurement apparatus comprising:

a receptacle for receiving the sample volume of the slurry;

a screen provided in the receptacle for separating out the desired solid component from a remainder of the slurry, whereby the solid component is retained in the receptacle to form a bed therein and the remainder is exhausted from the receptacle; and a measuring device being adapted to measure a physical characteristic of the bed thereby enabling a determination of a volume and/or mass of the solid component retained in the receptacle.

The receptacle may be adapted to receive a sample volume comprising at least ten litres of slurry.

The receptacle may be adapted to receive a sample volume comprising at least twenty litres of slurry.

The measurement apparatus may comprise a sampling container being arranged to receive the slurry for measuring off the sample volume of the slurry and to discharge the sample volume into the receptacle.

The sampling container may comprise a funnel having a funnel outlet that is closed off by a funnel valve.

The receptacle may be a cylindrical column having an open proximal end for receiving the slurry and a normally closed distal end and wherein the proximal end is flared.

The receptacle may have a column valve at the distal end for selectively opening or closing off the distal end.

The column may have a diameter:height ratio of between 1:5 and 1:40.

The column may have a diameter:height ratio of 1:10.

The screen may comprise perforations in a side wall of the receptacle.

The perforations may comprise one or more slots cut through the side wall.

Each slot may have a cross-sectional width of less than 1 mm.

The perforations may be covered by a filter or screen mesh.

The measuring device may comprise a laser being adapted to emit a laser beam into the receptacle to measure a height of the bed.

The laser may be arranged to emit the laser beam vertically down into the receptacle.

The measuring device may comprise a marked scale associated with the receptacle to measure a height of the bed.

The measuring device may comprise sensors to measure a height of the bed.

The sensors may comprise light sensors or electrical resistance sensors.

The measuring device may comprise a mechanical probe insertable into the receptacle to measure a height of the bed.

The measuring device may comprise a weight scale arranged to measure a weight of the bed.

The measuring device may comprise a camera arranged to capture an image of the bed, which image is adapted to be subjected to computerised image analysis to determine a height of the bed.

The measurement apparatus may include an inlet pipe for supplying the slurry from a slurry tank.

The measurement apparatus may comprise a pump or a siphon being in flow communication with the inlet pipe for causing flow of the slurry through the inlet pipe.

The inlet pipe may be joined to a manifold for supplying the slurry from a selected one of a multiple of slurry tanks.

The measurement apparatus may comprise a plurality of sprayers being arranged to spray water or another cleaning fluid over the receptacle to wash off any slurry and/or solid component from the receptacle.

The solid component may comprise granular particles.

The slurry may be obtained from a carbon-in-pulp or carbon-in-leach process and comprise granular carbon particles, ore pulp and water.

The slurry may be obtained from a resin-in-leach process and comprise granular particles of ion-exchange resin, ore pulp and water.

According to a further aspect of the invention, there is provided a method of measuring a volume of a desired solid component in a sample volume of a solid-liquid slurry, the method comprising the steps of:

inserting the sample volume of the slurry into a receptacle;

screening the sample volume to retain the desired solid component within the receptacle while exhausting the remainder of the slurry from the receptacle, whereby the solid component is retained in the form a bed within the receptacle; and measuring a physical characteristic of the bed thereby to determine a volume and/or mass of the solid component retained in the receptacle.

The physical characteristic that is measured may be a height of the bed.

The height of the bed may be measured by emitting a laser beam into the receptacle.

The physical characteristic that is measured may be a weight of the bed.

The method may include the step of measuring off the sample volume in a funnel prior to inserting the sample volume into the receptacle.

The method may include the step of spraying water or another cleaning fluid over the receptacle to wash away any remaining slurry and/or solid component from the receptacle once the laser has measured the height of the bed.

Yet further according to the invention, there is provided a control system for a leaching plant, wherein the leaching plant includes an adsorption process having one or more slurry tanks and a supply tank providing a supply of fresh granular carbon or resin to the adsorption process, the control system comprising:

a measurement apparatus being associated with the adsorption process for receiving sample volumes of slurry from the slurry tank or any one of the slurry tanks, and the measurement apparatus being adapted to determine concentrations of carbon or resin in the sample volumes; and a processing unit being in operative communication with the measurement apparatus and the supply tank;

whereby the processing unit is adapted to control a rate of supply of fresh carbon or resin from the supply tank and/or is adapted to control a rate of transfer of carbon or resin between the slurry tanks dependent on the concentrations of carbon or resin determined by the measurement apparatus.

The control system may comprise a measurement apparatus as described herein.

The control system may be operated according to a method as described herein.

BRIEF DESCRIPTION OF THE DRAWINGS

The present invention will now be described, by way of example only, with reference to the accompanying schematic drawings, in which.

DETAILED DESCRIPTION OF THE DRAWINGS

Figure 1:
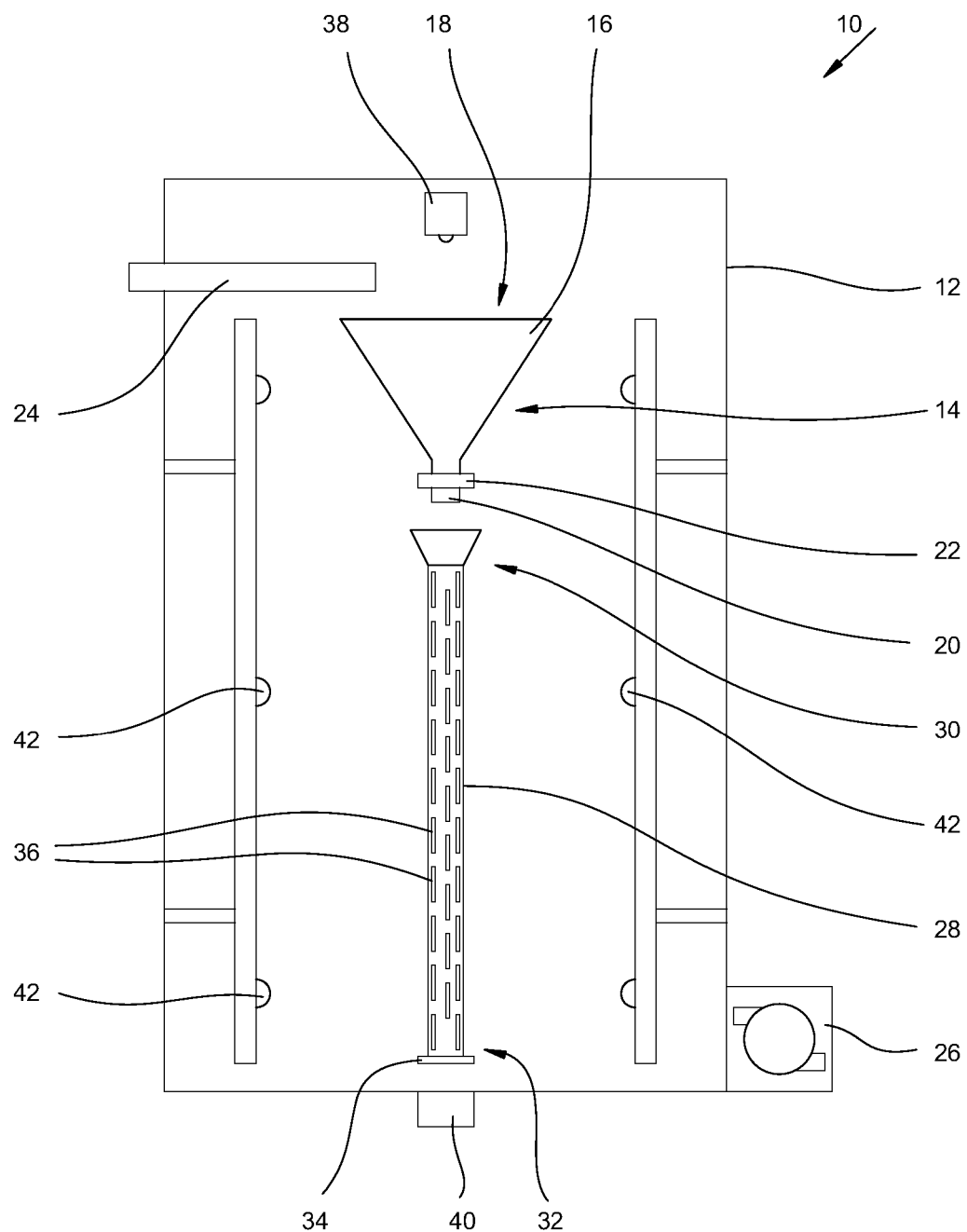
FIG. 1 is a side view of a measurement apparatus according to an embodiment of the present invention.

Referring to FIG. 1 of the drawings, there is shown a measurement apparatus in accordance with an embodiment of the invention, being generally indicated by reference numeral 10. The measurement apparatus 10 is adapted to receive a sample volume of a solid-liquid slurry from a slurry tank (not shown) and to measure the volume or concentration of a desired solid component contained within the slurry, wherein the solid component is in the form of suspended solid particles.

The measurement apparatus 10 includes a housing 12 supporting a sampling container in the form of a funnel 14 near an upper end thereof. The funnel 14 has a convergent side wall 16 leading from an open upper funnel mouth 18 to a lower funnel outlet 20 that is closed off by a funnel valve 22. A feed inlet pipe 24 leads into housing 12 from the slurry tank and terminates above the funnel mouth 18, whereby the inlet pipe 24 is disposed to dispense slurry from the slurry tank into the funnel 14.

The inlet pipe 24 is joined to a pump 26 for pumping the slurry into the funnel 14. Alternatively the slurry can be caused to flow through the inlet pipe 24 under gravity or due to siphoning or vacuum suction.

The funnel 14 is arranged to measure off a sample volume of slurry from the slurry tank. Accordingly the funnel 14 has indicating means for indicating when the sample volume is received therein, e.g. twenty litres. In the exemplary embodiment the indicating means are automated whereby the filling of the sample volume is controlled by suitable electronic sensors and level switches that shut off flow through the inlet pipe 24 once the funnel 14 is filled to the requisite level. However it should also be appreciated that the indicating means can also be graded level indicators marked on the side wall 16 and which are visible to an operator to manually see when the funnel 14 has been filled to the requisite level. Clearly it is to be understood that the side wall 16 can be transparent and that the level indicators can be marked either internally or externally on the side wall 16.

The sampling volume of twenty litres is a variable volume and can be increased or decreased as needed and may be dependent on the concentration and/or particle size of the solid particles contained in the slurry. It is noteworthy that having a sampling volume of twenty litres is in any event about ten to twenty times the volume being taken using the prior art manual sampling method discussed above in the background. Preferably the sampling volume should be at least ten litres.

The housing 12 further supports a receptacle in the form of a cylindrical column 28. The column 28 has an open proximal end 30 being aligned with the funnel outlet 20 so that, when funnel valve 22 is opened, the slurry sample volume can flow from funnel outlet 20 through open proximal end 30 into column 28. The proximal end 30 can be flared to avoid spillage of the slurry outside of the column 28. A distal end 32 of column 28 is normally closed off by a column valve 34. The column 28 has a perforated side wall that acts as a screen or filter whereby the perforations allow the passage of water and fine suspended ore pulp, but which prevent the passage of larger solid particles contained within the slurry. The size and dimension of the perforations is thus dependant on the type, size and shape of the solid particles to be extracted from the slurry. Thus in a scenario where the solid particles are in the form of granular activated carbon particles then the perforations may have a larger size, whereas in a scenario where the solid particles are in the form of a resin or resinous particles then the perforations may have a smaller size. In the exemplary embodiment the perforations are envisaged to be slots 36 having a width of less than 1 mm, however larger perforations or wider slots can be used if these are closed off by a suitable screen mesh or filter. In one embodiment the slots are axially aligned with a longitudinal axis of the column 28, i.e. being substantially vertically aligned with in the housing 12. However, in other embodiments the slots 36 could also extend partially radially, i.e. horizontally, around the column 28 or be angled between the horizontal and vertical.

Thereby, in use, as the slurry flows into the column 28 the solid particles are trapped within the column 28 while the water and ore pulp exit through the slots. The trapped solid particles build up a particle bed rising up from the distal end 32.

The column 28 has a diameter:height ratio that permits a desired depth particle bed to be trapped to enable relatively accurate measurement of the depth of the particle bed. The diameter:height ratio is preferably in the range of 1:5 to 1:40. In the exemplary embodiment the column 28 has a diameter of about 15 cm and a height of about 1.5 m resulting in a diameter:height ratio of 1:10. However the diameter:height ratio can be varied as needed, e.g. for slurries having a higher concentration of or larger solid particles the ratio can be reduced so that the depth of the particle bed increases more slowly, whereas for slurries having a lower concentration of or smaller solid particles the ratio can be increased so that the depth of the particle bed increases more quickly. It will be appreciated that a greater variation in the height of the particle bed will yield more accurate measurement, but care should be taken not to have air traps against the wall of the column 28.

In the exemplary embodiment, a laser 38 is adapted to measure the height of the particle bed. The laser 38 can be mounted directly above the column 28 and be directed to emit a laser beam down into the column 28 through the proximal end 30. Alternatively, as shown in the drawings, the laser 38 is mounted centrally above the funnel 14 and is directed to emit a laser beam down through the funnel outlet 20 into the column 28 through the proximal end 30. In the latter embodiment the funnel valve 22 will need to remain open for the laser beam to pass therethrough to measure the height of the particle bed.

In other embodiments, the measuring apparatus 10 can be provided with other measuring devices that are capable of measuring a physical characteristic of the particle bed, e.g. its height or weight, from which a volume and/or mass of the particle bed can be determined. For example, the measuring apparatus 10 can include a marked scale associated with the column 28, or it can include a series of incremental sensors spaced at discrete axial positions along the column 28, e.g. light or electrical resistance sensors, or it can include a mechanical probe insertable into the column 28. In yet other embodiments, the measuring apparatus 10 can include a weight scale for measuring a weight of the particle bed. It would even be possible to use a camera to capture an image of the particle bed (being either a still or live feed image) and subsequently determine the height of the particle bed by image analysis/recognition using a computer software programme.

The housing 12 has a drain 40 provided in its base and located beneath the column 28. The drain 40 can lead to a waste outlet, but is preferably connected via a return pipe to the slurry tank so that the water and ore pulp that exits the column 28 is exhausted back to the slurry tank. Similarly, when the column valve 34 is opened, the particle bed can be flushed from the column 28 through the distal end and exhausted to the slurry tank.

A number of sprayers 42 are provided within the housing 12 and are arranged to spray water, or any other cleaning fluid, over and through the funnel 14 and the column 28 to wash off any remaining slurry therefrom after use.

A further pump (not shown) can be provided and operatively connected to the drain 40 and the sprayers 42 to cause operation thereof.

Referring now to FIGS. 2 to 5, the various steps performed during operation of the measurement apparatus 10 will be described. The operation thereof is described with reference to slurry obtained from a gold leaching plant and thus primarily consists of water, ore pulp and solid carbon particles.

Figure 2:
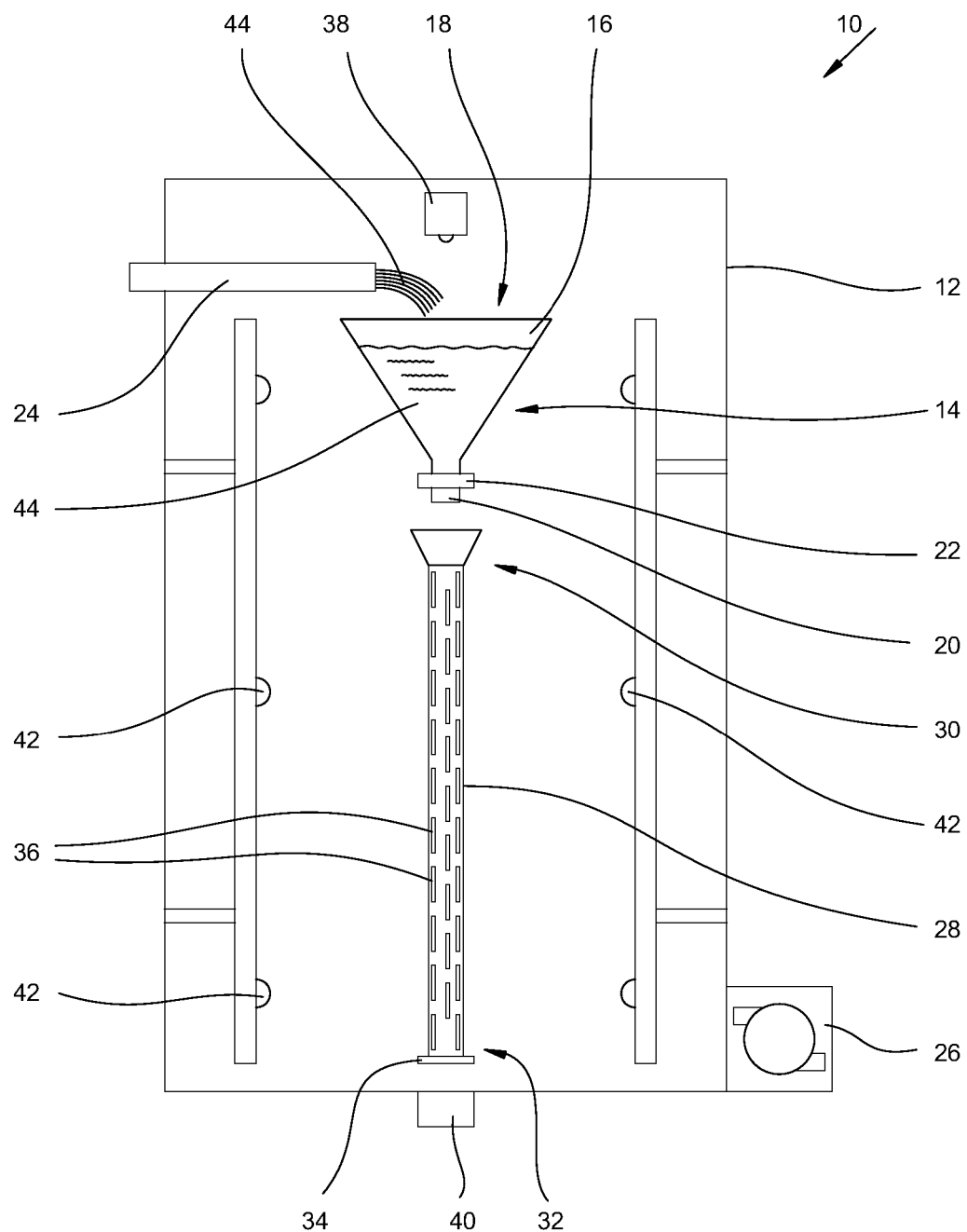
FIG. 2 illustrates a first step in the use of the measurement apparatus of FIG. 1.

In a first step shown in FIG. 2, the funnel valve 22 is closed and slurry 44 is pumped from the slurry tank through the inlet pipe 24 and dispensed into the funnel 14 to fill the funnel 14 to a desired level. As mentioned above, the volume of slurry pumped into the funnel 14 will preferably be about twenty litres as this volume is likely to contain a sufficient volume of carbon particles to obtain a particle bed of sufficient height that permits accurate measurements. When the slurry reaches the desired level, the slurry activates the level switch to shut off flow of the slurry through the inlet pipe 24.

Figure 3:
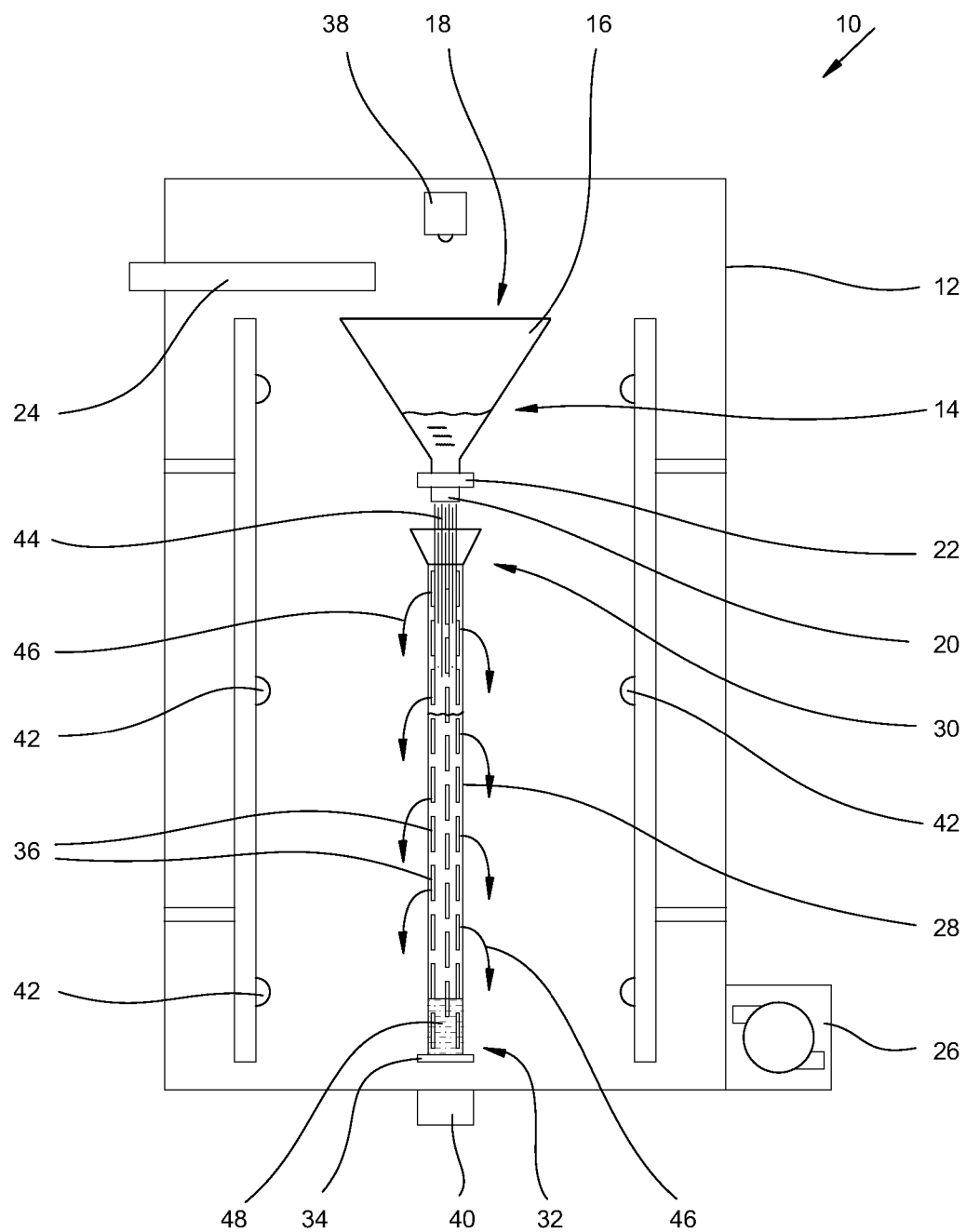
FIG. 3 illustrates a second step in the use of the measurement apparatus of FIG. 1.

In a second step shown in FIG. 3, the funnel valve 22 is opened to permit the slurry 44 to flow under gravity through the funnel outlet 20 and into the column 28. The slurry is strained by the column 28 whereby the water and ore pulp content 46 of the slurry immediately starts exiting the column 28 through the slots 36 and are exhausted from the housing 12 through the drain 40. Meanwhile the larger solid carbon particles 48 are caught in the column 28 and sink to the bottom thereof where they start to build up a particle bed 50 rising up from the distal end 32. The sprayers 42 can be activated at this time to assist in liquidising the slurry 44 so that the ore pulp washes out of the column 28 more quickly, to assist in avoiding blockages of the slots 36 and further to assist in washing out any remaining ore solids that may be entrapped within the particle bed 50. The sprayers 42 can include sprayer located above the funnel 14 for washing out any residual slurry 44 from the funnel 14 into the column 28.

Figure 4:
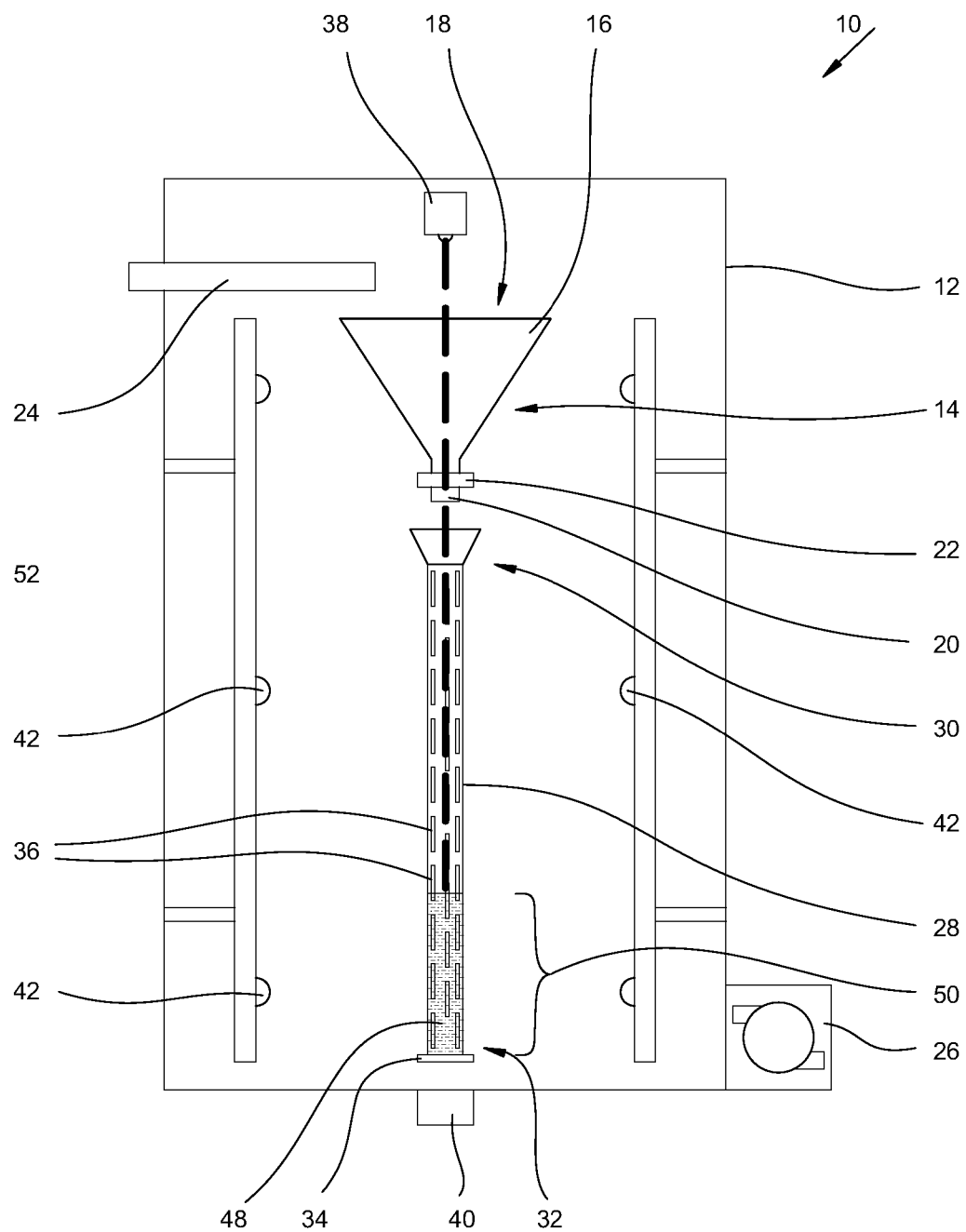
FIG. 4 illustrates a third step in the use of the measurement apparatus of FIG. 1.

In a third step shown in FIG. 4, once all the water and ore pulp has drained away, the resultant particle bed 50 will settle and its depth (its height above the distal end 32) can be measured using a laser beam 52 emitted by the laser 38. Due to the known diameter and height of the column 28 it is possible to determine the volume of the particle bed 50 and accordingly the volume of the carbon particles 48 that were contained in the sample volume of the slurry 44. This enables calculation of the carbon concentration in the slurry 44.

In the other embodiments of the measuring apparatus 10 suggested above that are provided with different measuring devices, the height of the particle bed 50 can be measured in the relevant manner required. Thus where the marked scale is associated with the column 28, the height can be measured by visual inspection along the marked scale. Alternatively a reading can be taken from the series of incremental sensors. Yet further, the mechanical probe can be inserted into the column 28 until it contacts the top surface of the particle bed 50, or the weight of the particle bed 50 can be measured from which its volume can be calculated. Alternatively an image of the bed can be captured by the camera and the image subjected to computerised image analysis to determine a height of the bed.

Figure 5:
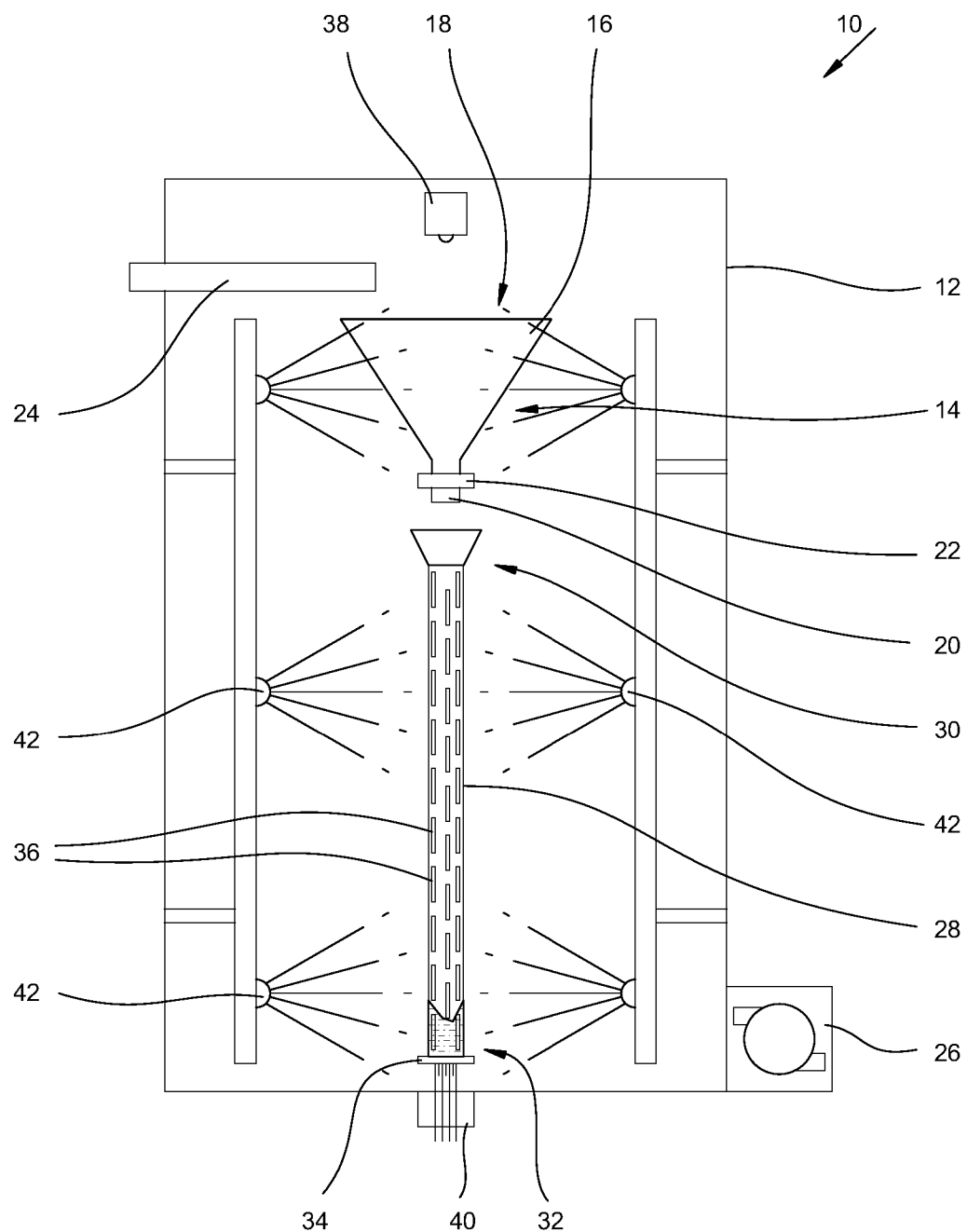
FIG. 5 illustrates a fourth step in the use of the measurement apparatus of FIG. 1.

Finally, in a fourth step shown in FIG. 5, the column valve 34 is opened to allow the particle bed to be flushed out of the column 28 and be exhausted down the drain 40. The sprayers 42 are then activated to wash out any remaining slurry from the funnel 14 and any remaining carbon particles from the column 28, whereafter the measurement apparatus 10 is ready for use to measure a subsequent sample. The flushing also assists in preventing corrosion to the various parts of the measurement apparatus 10.

The use of the measurement apparatus 10 permits the relatively quick measurement and analysis of a slurry concentration without imposing any undue burden on the operator thereof. As such it is possible for the measuring apparatus to be used repetitively at frequent intervals and thereby permit the continuous automated sampling of a slurry tank to determine the concentration of carbon particles contained in the slurry therein. For example, automated samples may be taken at intervals being less than fifteen minutes, or even less than ten minutes. If sampling is deemed extremely important, it would even be possible to take immediately repetitive samples whereby the interval time would merely be limited by the time duration for performing the sampling steps described above, i.e. a subsequent sample volume of slurry could be received into and measured off in the funnel 14 immediately after a particle bed 50 from a previous sample volume is flushed out of the measuring apparatus 10. Furthermore, by connecting multiple measuring apparatuses 10 in parallel to each other, the sampling periods can be further reduced by staggering the above described operational steps, e.g. while a one measuring apparatus 10 is performing the first step, another measuring apparatus 10 can be performing the second or third step.

It should be understood that the inlet pipe 24 can be joined to an inlet manifold (not shown) leading from each of a multitude of slurry tanks in a leaching process thereby enabling slurry from any one of the tanks to be directed to the measurement apparatus 10 for analysis.

The measurement apparatus 10 can be used as a single stand-alone mobile unit permitting it to be moved to and connected to a selected slurry tank in a leaching plant.

Figure 6:
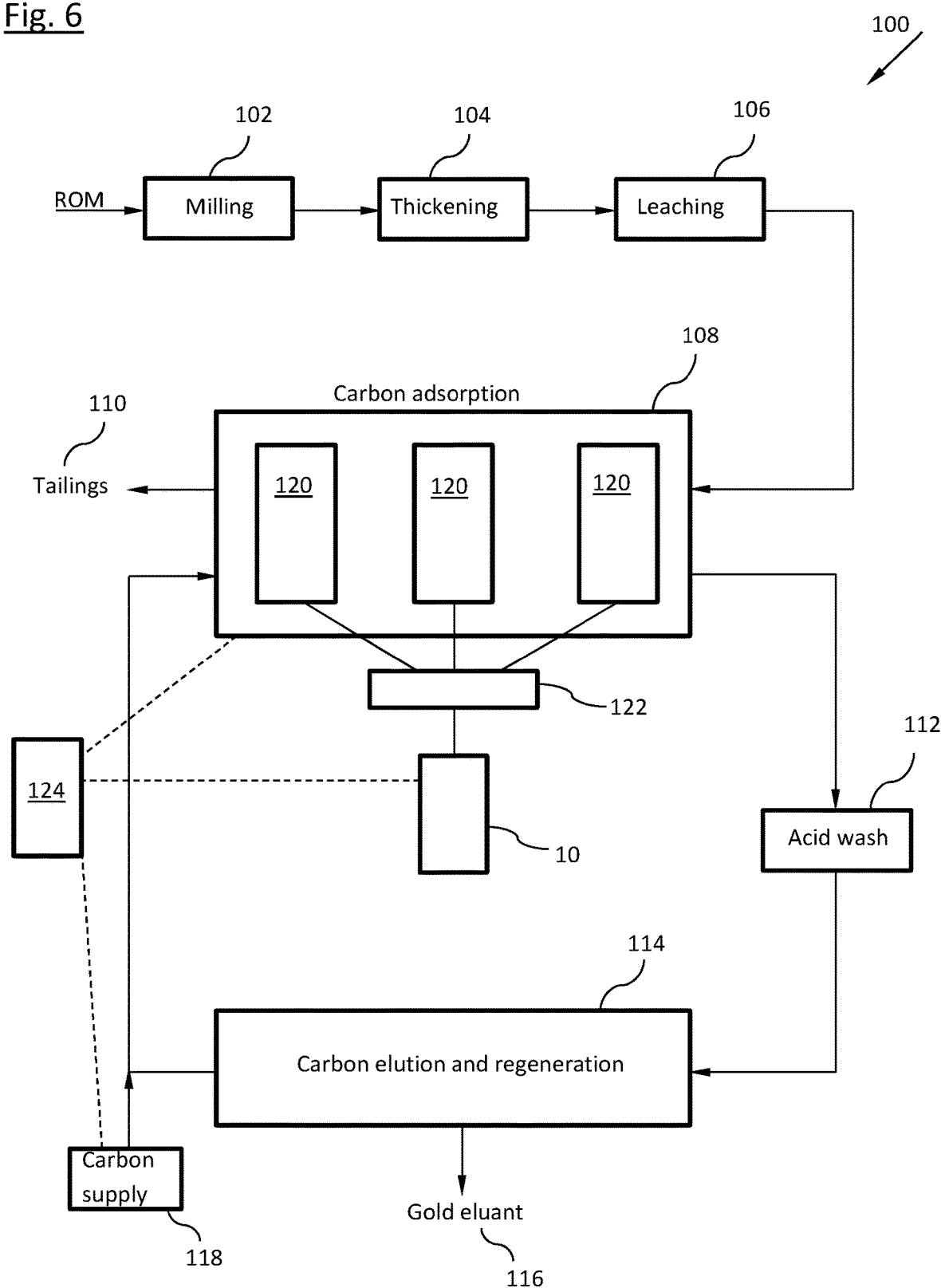
FIG. 6 is a schematic layout of a leaching plant provided having a control system that utilises a measurement apparatus according to an embodiment of the present invention.

Alternatively, with reference to FIG. 6, the measurement apparatus 10 can be integrated with a control system provided in a leaching plant 100. In the plant 100 run-of-mine ore is ground in a milling process 102 and then optionally thickened 104, before entering a leaching process 106. The leached pulp is mixed with granular carbon particles and subjected to a carbon adsorption process 108 during which gold is deposited onto the carbon particles. The leached pulp residue is disposed of to the tailings 110, whereas the gold-laden carbon is further processed by acid washing 112 and subsequently in a carbon elution and regeneration process 114 to recover the gold eluate 116. A carbon supply tank 118 feeds in a supply of fresh carbon into the carbon adsorption process 108 to compensate for any carbon lost during operation of the leaching plant 100.

The carbon adsorption process 108 includes one or more slurry tanks 120 provided in series and wherein each of the slurry tanks 120 is operatively connected to be in flow communication with a measurement apparatus 10 via a manifold 122. The leaching plant 100 includes a control system for regulating the control thereof. It will be appreciated that the control system for such a plant will be relatively complex and include numerous parts and communication channels. In FIG. 6 only a part of the control system is shown and indicated by reference numeral 124, wherein the control system 124 is operatively connected to the carbon adsorption process 108 and each of the slurry tanks 120 therein, the carbon supply tank 118, the manifold 122 and to the measurement apparatus 10.

By means of the measurement apparatus 10 regularly analysing the carbon concentration within the slurry tanks 120, the control system receives input of the carbon concentration distribution in each of the slurry tanks 120 and also a total carbon content within the carbon adsorption process 108. Dependent on the analysis result received from the measurement apparatus 10, the control system 124 is adapted to operate carbon transfer pumps provided between the slurry tanks 120 to automatically pump the carbon particles from one slurry tank 120 to the next and thereby ensure that an optimal concentration of carbon particles is contained within each of the slurry tanks 120. The control system 124 also controls the rate of feeding in of additional fresh carbon from the carbon supply tank 118. Thus if too much carbon is detected within the carbon adsorption process 108, then the rate of addition of fresh carbon is reduced so that a net outflow of carbon particles from the leaching process 100 occurs as the gold-laden carbon is removed for further processing. Similarly, if too little carbon is detected within the carbon adsorption process 108, then the rate of addition of fresh carbon is increased so that a net inflow of carbon to the leaching process 100.

It should further be understood that the measurement apparatus 10 is not restricted to measuring carbon particles in a leaching process. It is known that some leaching processes utilise resin particles in place of carbon particles and accordingly the measurement apparatus 10 can as easily measure the concentration of such resin particles.

Other further uses or applications of the measuring apparatus could also include the provision of suitable filters or screen meshes at any suitable location in the sampling stream, e.g. within the inlet pipe 24 or the funnel 14 or the column 28, whereby other sized particles can be extracted and utilised to form the particle bed that is measured by the laser 38. Thus it may be possible to measure the volume of dissolved oxygen and/or the cyanide concentration and/or pulp density in the slurry.

Modifications and variations as would be apparent to a skilled addressee are deemed to be within the scope of the present invention.

The invention claimed is:

1. A measurement apparatus for use in mineral processing arranged to measure a volume of a desired solid particulate component in a sample volume of a solid-liquid slurry, the measurement apparatus comprising:
 a receptacle for receiving the sample volume of slurry, the receptacle having an open proximal end for receiving the slurry, a normally closed distal end, and a side wall provided between the proximal end and the distal end;
 a screen provided in the receptacle for separating out the desired solid particulate component from a remainder of the slurry, whereby in use the solid particulate component is retained in the receptacle to form a bed therein building up in height from the distal end, and the remainder is exhausted from the receptacle;
 wherein the screen is provided in the side wall of the receptacle; and
 a measuring device being adapted to measure a physical characteristic of the bed comprising the separated out solid particulate component, thereby enabling a determination of a volume and/or mass of the solid particulate component retained in the receptacle; and
 a separate sampling container being arranged to receive the slurry for measuring off the sample volume of the slurry and to discharge the sample volume into the receptacle.

2. A measurement apparatus as claimed in claim 1, in which the screen extends along a full height of the side wall.

3. A measurement apparatus as claimed in claim 1, in which the receptacle is adapted to receive a sample volume comprising at least ten litres of slurry.

4. A measurement apparatus as claimed in claim 1, in which the receptacle is adapted to receive a sample volume comprising at least twenty litres of slurry.

5. A measurement apparatus as claimed in claim 1, in which the sampling container comprises a funnel having a funnel outlet that is closed off by a funnel valve and wherein the valve is adapted to open and allow the transference of the measured off sample of slurry to the receptacle.

6. A measurement apparatus as claimed in claim 1, in which the measuring device comprises a laser being adapted to emit a laser beam into the receptacle to measure a height of the bed.

7. A measurement apparatus as claimed in claim 1, in which the measuring device comprises a marked scale associated with the receptacle to measure a height of the bed formed by the transfer of the sample of slurry retained in the sampling container.

8. A measurement apparatus as claimed in claim 1, in which the measuring device comprises light sensors or electrical resistance sensors configured to measure a height of the bed.

9. A measurement apparatus as claimed in claim 1, in which the measuring device comprises a weight scale arranged to measure a weight of the bed formed by the transfer of the sample of slurry retained in the sampling container.

10. A measurement apparatus as claimed in claim 1, in which the measuring device comprises a camera arranged to capture an image of the bed, which image is adapted to be subjected to computerised image analysis to determine a height of the bed.

11. A measurement apparatus as claimed in claim 1, in which an inlet pipe is joined to a manifold for supplying the slurry from a selected one of a multiple of slurry tanks.

12. A measurement apparatus as claimed in claim 1, including a sprayer being arranged to spray water or another fluid into the receptacle to assist in liquidizing the slurry.

13. A measurement apparatus as claimed in claim 1, in which the screen comprises one or more slots in the side wall of the receptacle.

14. A measurement apparatus as claimed in claim 13, in which the slots have a width of less than 1 mm.

15. A measurement apparatus as claimed in claim 1, in which the receptacle is a cylindrical column and wherein the column has a diameter:height ratio of between 1:5 and 1:40.

16. A measurement apparatus as claimed in claim 15, in which the column has a diameter:height ratio of 1:10.

17. A control system for a leaching plant, wherein the leaching plant includes an adsorption process having one or more slurry tanks and a supply tank providing a supply of fresh granular carbon or resin to the adsorption process, characterised in that the control system comprises:
 a measurement apparatus as claimed in any one of claims 1 to 4, claims 5 to 11, and claim 12 being associated with the adsorption process for receiving sample volumes of slurry from the slurry tank or any one of the slurry tanks, wherein the measurement apparatus is configured to determine concentrations of carbon or resin in the sample volumes; and
 a processing unit being in operative communication with the measurement apparatus and the supply tank;
 whereby the processing unit is configured to control a rate of supply of fresh carbon or resin from the supply tank and/or is configured to control a rate of transfer of carbon or resin between the slurry tanks dependent on the concentrations of carbon or resin determined by the measurement apparatus.

18. A method of measuring a volume of a desired solid particulate component in a sample volume of a solid-liquid slurry related to mineral processing, the method comprising the steps of:
 capturing a sample volume of the slurry from the slurry flow into a separate sampling container, then
 transferring the sample volume of the slurry into a receptacle, wherein the receptacle has an open proximal end for receiving the slurry, a normally closed distal end, and a side wall provided between the proximal end and the distal end, and wherein a screen is provided in the side wall of the receptacle;
 screening the sample volume to retain the desired solid particulate component within the receptacle while exhausting the remainder of the slurry from the receptacle, whereby the solid particulate component is retained in the form of a bed that builds up in height from the distal end; and
 measuring a physical characteristic of the bed thereby to determine a volume and/or mass of the solid particulate component retained in the receptacle.

19. A method as claimed in claim 18, in which the physical characteristic that is measured is a weight of the bed.

20. A method as claimed in claim 18, in which the physical characteristic that is measured is a height of the bed.

21. A method as claimed in claim 20, in which the height of the bed is measured by emitting a laser beam into the receptacle.

22. A method as claimed in claim 18, which includes the step of measuring off the sample volume in a funnel prior to inserting the sample volume into the receptacle.

23. A method as claimed in claim 22, which includes the step of spraying water into the funnel to liquidise the slurry prior to inserting the slurry into the receptacle.

\* \* \* \* \*